United States Patent
Hause

[15] 3,659,414

[45] May 2, 1972

[54] HYDRODYNAMIC UNIT FOR POWER TRANSMISSION

[72] Inventor: Gilbert K. Hause, Bloomfield Hills, Mich.

[73] Assignee: General Motors Corporation, Detroit, Mich.

[22] Filed: Nov. 23, 1970

[21] Appl. No.: 91,812

Related U.S. Application Data

[62] Division of Ser. No. 805,745, Mar. 10, 1969, Pat. No. 3,590,966.

[52] U.S. Cl. ................................................60/54, 220/5
[51] Int. Cl. ..................................F16d 31/06, F16d 33/00
[58] Field of Search ..................................................60/54, 12

[56] References Cited

UNITED STATES PATENTS

| | | |
|---|---|---|
| 1,689,245 | 10/1928 | Klimek .............................. 192/3.21 |
| 2,453,811 | 11/1948 | Pennington .......................... 192/3.21 |
| 3,250,222 | 5/1966 | Zeidler ................................ 60/54 X |
| 3,326,066 | 6/1967 | Murphy .............................. 192/3.33 |
| 3,384,209 | 5/1968 | Murphy .............................. 192/3.33 |

Primary Examiner—Edgar W. Geoghegan
Attorney—W. E. Finken, A. M. Heiter and Charles R. White

[57] ABSTRACT

Power transmission in which the input rotor of a hydrodynamic torque-transmitting unit and a rotatable transmission input are selectively clutched and unclutched to control power flow through the unit. Controls associated with a gear selector mechanism for forward and reverse gearing effect the momentary disconnection of the input rotor and the transmission input when shifting gears. Disc brakes selectively engageable with the differential input provide vehicle service brakes. The housing of the torque-transmitting unit is rigidly connected to the transmission input by deforming a portion of the housing into appropriate openings formed in the transmission input.

7 Claims, 1 Drawing Figure

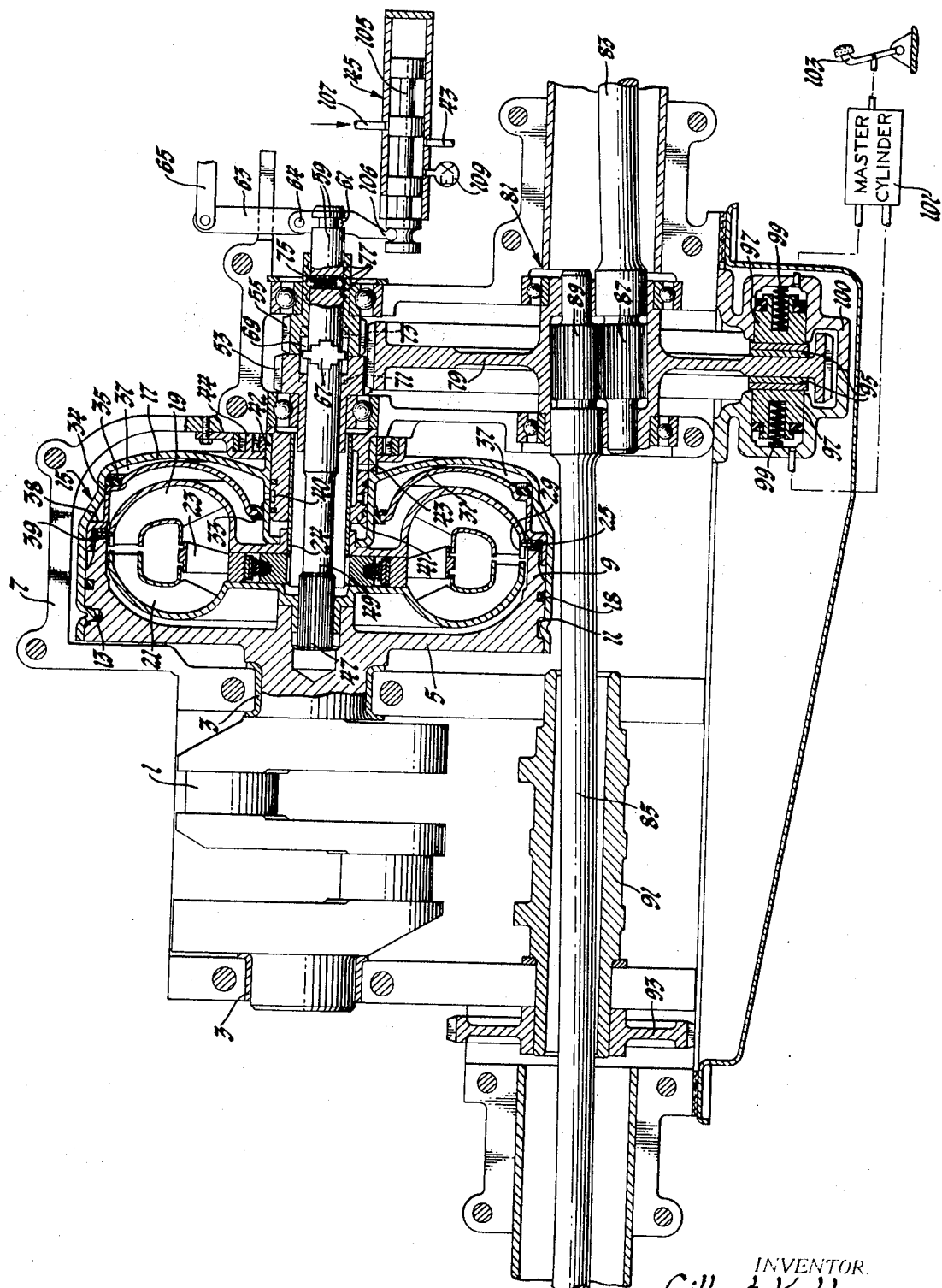
INVENTOR.
Gilbert K. Hause
BY
Charles R. White
ATTORNEY

HYDRODYNAMIC UNIT FOR POWER TRANSMISSION

This is a division of application Ser. No. 805,745, filed Mar. 10, 1969 now U.S. Pat. No. 3,590,966.

This invention relates to power transmissions and more particularly to a transmission featuring a new and improved connection between the transmission input and a hydrodynamic unit housing, unique forward and reverse gearing driven by the unit and controls therefor, and an advanced clutch and controls for selectively coupling and uncoupling the hydrodynamic unit rotor and the transmission input.

In low-power-to-weight vehicles, such as the small economy type passenger car, multi-stepped manual transmissions are generally employed to provide a range of output torques needed for efficient vehicle operation. Due to the cost, complexity, and space requirements, automatic torque converter transmissions generally have not been employed in such vehicles.

This invention provides a highly efficient torque converter transmission, which is inexpensive, uncomplicated, and sufficiently small to be effectively employed in the low-power-to-weight vehicles mentioned above. Although this invention is primarily for smaller vehicles as mentioned above, it can be employed in larger vehicles such as the standard six-passenger car.

The cost of this transmission is materially reduced by utilizing a new and improved connection between the flywheel and converter housing. Furthermore, simplified forward and reverse gearing is provided and there are new and improved controls for eliminating power flow through the converter when the transmission gearing is conditioned for neutral. In this invention, forward and reverse transmission gears mesh directly with the differential input gear, thereby providing a reduction in transmission size and weight. In this invention the converter pump is selectively connected to the flywheel by improved clutch and controls for forward and reverse drives.

An object of this invention is to provide a new and improved transmission featuring a hydrodynamic unit selectively driving forward or reverse gearing meshing directly with differential input.

Another object of this invention is to provide a transmission having a hydrodynamic unit and a new and improved connection between a rotatable component of the unit, such as a hydrodynamic unit rotor.

Another object of this invention is to provide a new and improved connection between an annular transmission input and a metallic torque converter housing in which a portion of the housing is deformed into an annular groove and spaced openings to rigidly connect these parts in an assembly.

Another object of this invention is to provide a transmission including a hydrodynamic unit having an input rotor selectively connected to the transmission input by a new and improved clutching mechanism and controls so that the unit can transmit input torque therethrough.

Another object of this invention is to provide a new and improved torque converter transmission having a converter pump selectively connected with an input member by new and improved clutch and controls and in which forward and reverse gearing, selectively clutched to a converter driven shaft, is directly connected to drive a differential input gear.

These and other objects of the invention will become more apparent from the following detailed description and from the drawing in which:

The FIGURE is a side view partly in section of a torque converter transmission and controls thereof.

As shown in the FIGURE, engine crank shaft 1, journaled in bearings 3 is drivingly connected to a flywheel 5 located in case 7. The flywheel has an annular rim 9 with an outwardly facing circular groove 11 machined therein and a series of spaced holes 13. The holes are drilled radially inwardly from the bottom of the groove toward the rotational axis of the flywheel 5 and a connected torque converter 15. The torque converter has a metallic shell-like housing 17, which has an annular side that fits over the rim of the flywheel. The annular portion of the side of the housing which extends over the groove 11 and radial holes 13 is deformed into the grooves and holes to rigidly assemble the housing to the flywheel.

This connection may be accomplished by utilizing an electromagnetic forming process. The housing is slipped on the flywheel and held in place by a fixture and then placed inside an electromagnetic forming coil. Upon discharge of sufficient electrical energy through the coil, from a capacitor bank, for example, the portion of the housing aligned with the groove and holes is swaged simultaneously into the groove and holes by magnetic forces emanating from the coil to rigidly connect the parts. The annular seal 18 disposed between the flywheel and the housing 17 makes this assembly fluid-tight. If desired, the assembly can be made employing a mechanical rolling operation with the holes staked for torsional rigidity.

The torque converter has a pump 19, a turbine 21 and a stator 23 bladed in a conventional manner for the circulation of oil supplied to the converter by a supply passage, not shown. A one-way brake connects the stator to a ground sleeve 24.

A clutch unit, which is preferably operated by engine oil, is employed to selectively connect or disconnect the flywheel and the pump; this unit comprises an annular, longitudinally movable friction plate 25 which has spaced tabs or teeth on the inner diameter which fit into corresponding spaced and longitudinally extending slots 29 formed in the outer shell of the pump thereby providing a spline-like connection. There is also an annular piston 31 disposed in the converter housing having an inner annular shoulder with a seal 33 molded thereon. This seal slidably mounts the piston on the inner cylindrical shoulder of the housing 17 as shown. The piston also has an outer annular shoulder 34 and annular seal 35 which slidably contact an annular internal portion of the housing to provide a chamber 37 between the end of housing 17 and piston 31. This chamber receives a pressure oil which effects displacement of the piston so that the radially extending annular apply surface 38 of the piston will contact the friction plate 25 and move it into frictional engagement with the transverse end portion of the flywheel to drivingly connect the flywheel and pump. When chamber 37 is open to exhaust, converter pressure provides the releasing force for piston 31 and the clutch 25. As shown in the FIGURE the outer end of the piston has extending tangs or fingers 39, which slidably engage with splines on the outer periphery of the flywheel. The piston only moves about 0.015 inch between full apply and full release and is always guided. The piston and housing have a similar radius of curvature to provide a compact arrangement of parts. The housing 17 further has a cylindrical sleeve 42 that extends away from the torque converter and is operatively connected to the drive gear of fluid pump 44. Because the metal in the converter housing 17 extends into the axial holes in the flywheel, there is sufficient torsional rigidity to permit the engine and flywheel to drive the pump through the housing.

Chamber 37 is hydraulically connected by a passage in the housing to an annular groove 40 formed in a support sleeve 41, that supports rotatable housing 17 and rigidly connects the ground sleeve to case 7. Annular groove 40 is connected by a suitable passage 43 to a control valve 45, which will be later described. The turbine 21 has a hub journaled in the flywheel and is drivingly connected by splines 47 to a power transmitting shaft 49. This shaft is coaxial with the flywheel and torque converter and extends from the torque converter through forward and reverse drive gears 53 and 55 respectively located adjacent to one another and rotatably mounted on the shaft. The shaft terminates in an end extension having spaced flanges 59 arranged to slidably receive a pin 61 therebetween secured to a crank member 63 which is supported in case 7 for turning with respect to axis 64. This crank member is turned by link 65 operatively secured to a conventional shift lever, not shown. The shaft 49 carries a stepped tooth dog clutch element 67 that is fixed to the shaft and is accommodated by recess 69 formed between the gears 53 and 55. These gears are formed with internal clutching teeth 71 and 73 respectively which are drivingly engageable with the stepped tooth dog clutch element to connect the shaft 49 to either gear 53 or gear 55. In the position shown in the drawing, the dog clutch element is in the neutral position and no power can flow from the shaft to either gear.

The shaft 49 can be selectively connected to either gear 53 or 55 by appropriate axial movement of the shaft from the illustrated position in response to actuation of the shift lever and the corresponding longitudinal movement of connected link 65 and rotation of crank 63. As shown, the shaft carries a spring biased ball detent 75, whose ball members fit into anyone of the three side-by-side spaced grooves 77 to releasably hold the shaft in an adjusted position. When the shaft 49 is moved in either direction from its neutral position, illustrated in the drawing, the teeth of the dog clutch element engage the appropriate clutching teeth of the selected gear 53 or 55 to thereby drivingly connect the shaft 49 with the selected gear.

Gear 53, providing a forward drive gear, meshes with gear 79 of a differential drive 81, which is the subject of U.S. Pat. No. 3,520,213 issued July 14, 1970 to Gilbert K. Hause and Clifford C. Wrigley and this differential is only briefly described here.

The gear 55 meshes with an idler not shown, which in turn meshes with differential input gear 79 to provide a reverse drive. As shown, gear 79 has transverse openings into which the inner ends of a pair of axle shafts 83 and 85 are rotatably journaled. These shafts extend longitudinally as does shaft 49 and have meshing spur gears 87 and 89 to provide for differential speeds of the drive wheels when the vehicle using this transmission negotiates a turn. To provide a compact power package, axle shaft 85 is disposed through engine cam shaft 91 which is driven by timing gear 93.

In this invention disc brakes are employed on opposite sides of the gear 79 to provide vehicle service brakes. As shown, each brake assembly comprises a brake shoe 95, hydraulically actuated piston 97 and spring 99. Each shoe comprises a friction liner secured to a plate movably mounted in fixed caliper 100. The spring 99 is disposed at the rear of each piston, mounted in a bore in the caliper, provides a low force to lightly engage the shoe with the friction surface of gear 79 to thereby provide a mechanism for automatically adjusting the brakes as they wear. The parasitical drag of the lining on the friction surface of the gear is sufficiently low so that it can be disregarded. The brakes are operated in a lubricant for improved cooling. As diagrammatically illustrated, the pistons are hydraulically connected to a master cylinder 101 so that the brakes are applied when the brake pedal 103 is depressed and so that they are released when the brake pedal is released.

The control valve 45 has a valve element 105 shiftable to direct fluid to and away from the piston chamber 37. As shown, the valve element has a flanged operator end portion which slidably receives the extension 106 of crank 63. In the neutral position shown, the valve element blocks the supply of fluid from the pump 44 fed to the valve through passage 107. With no pressure in chamber 37 the clutch plate will be disengaged by converter supply pressure. In neutral, both the converter and gear clutches are disengaged to provide a no-torque neutral.

In operation, forward drive is selected by moving link 65 to the right thereby turning crank 63 on pivot 64 clockwise. Crank pin 61 will ride upwardly between flanges 59 and also push shaft 49 in toward the crank shaft with splines 47 permitting this movement.

The dog clutch element 67 engages clutching teeth 71 to lock the forward gear 53 to the shaft 49. At the same time, the valve element is shifted to a forward drive position with the center land blocking exhaust 109 and the passage 43 open to the passage 107. Fluid pressure is admitted to chamber 37 and the clutch is applied to connect the pump to the flywheel. Under these conditions the torque converter is operative to transmit and multiply torque to shaft 49. Power flows through shaft 49 through the forward drive gear 53 to differential gear 79 which runs partially submerged in oil. Power then flows to the axle shafts 83 and 85. Reverse is selected by pushing link 65 toward the converter to turn the crank counterclockwise with respect to pivot 64. The crank slides shaft 49 to the right so that dog clutch element 67 will drivingly engage the reverse gear 55 and also move the valve element through a neutral, exhaust position to a third position in which chamber 37 is again charged with fluid under pressure. This momentary interruption of converter operation when shifting between forward and reverse causes shaft 49 and the gear 79 to decelerate and prevents a sudden torque reversal on the differential input gear.

Springs 99 apply forces only sufficient to maintain the shoes in light contact with the lubricated annular friction surfaces of the large transfer or differential gear 79 and without removing the oil film thereon. This provides for improved braking since the shoes will effect high capacity braking action as soon as pedal 103 is depressed. The lubricant in the housing is at least sufficient to cover the friction surfaces of the brake shoes.

It will be appreciated that this invention provides an improved power package with an advanced torque converter design, improved transfer gearing and also advanced braking as well as the other advancements and improvements set forth above. Although a particular embodiment of this invention is shown and described, it will be understood that this is merely illustrative of the invention and other modifications can be readily made. My invention is defined in the claims which follow.

I claim:

1. In a power transmission, an input member, a hydrodynamic unit comprising a housing and input rotor means and output rotor means, connecting means drivingly connecting said housing to said input rotor means, torque-transmitting means operatively connected to said output rotor means, said input member having a cylindrical outer surface, recess means formed in said input member which extend inwardly and radially from said cylindrical outer surface thereof, said housing having an extending portion which fits closely over said cylindrical outer surface of said input member, and said extending portion of said housing having integral and inwardly extending projections which extend radially from the inside of said housing into said recess means to rigidly secure said input member to said housing.

2. In a power transmission, an input member, a hydrodynamic unit operatively connected to said input member, torque-transmitting means operatively connected to said hydrodynamic unit, said hydrodynamic unit having a rotatable member formed with a curved extension, said input member having a curved extension, one of said extensions being nested within the other of said extensions, and connecting means for rigidly joining said extensions including recess means formed in one of said extensions and integral projecting means formed in the other of said extensions and extending radially into said recess means.

3. The power transmission of claim 2 wherein said recess means is an annular groove formed in one of said extensions and said projecting means is an annular indentation formed in the other of said extensions.

4. The power transmission of claim 2 wherein said recess means comprises an annular groove and inwardly extending spaced holes which lead inwardly from the bottom surface of said groove, and said projecting means comprising an annular depression and a series of projections formed from the material of said associated extension disposed in said groove and said holes.

5. The power transmission of claim 2 wherein said input member is an engine crank shaft with a flywheel secured to the one end thereof, said curved extension of said input member being formed by an outer peripheral portion of said flywheel, said recess means comprising an annular groove in the outer peripheral portion of said flywheel, a series of inwardly extending and spaced holes leading inwardly from the bottom surface of said annular groove, and said projecting means comprising an annular depression and a series of projections formed from the material of said extension of said rotatable member operatively disposed in said groove and in said holes respectively to rigidly secure said extension of said rotatable member to said flywheel, and said rotatable member and said extension combining with said flywheel to provide a housing for said hydrodynamic unit.

6. In a power package for a vehicle, rotatable input shaft means having a flywheel formed at one end thereof, said flywheel having an annular peripheral surface, said peripheral surface having an annular groove and having circumferentially spaced holes which extend inwardly from the bottom of said groove into said flywheel, a torque transmitting hydrodynamic unit having a rotatable outer shell member, said shell member having an annular extending portion which fits closely over the outer periphery of said flywheel and which cooperates therewith to form a sealed housing for said hydrodynamic unit, said shell member having an annular deformation extending into said annular groove and having spaced inwardly extending projections extending into said holes to rigidly secure said housing to said flywheel, and annular seal means operatively disposed between said shell member and said outer peripheral surface of said flywheel to provide for the fluid tight sealing of said hydrodynamic unit.

7. In a power package, an input member comprising an engine crank shaft with an annular flywheel formed at one end thereof, a hydrodynamic unit comprising a rotatable shell member and input rotor means and output rotor means, said flywheel having an outer annular peripheral surface, annular recess means extending around said peripheral surface of said flywheel, said shell member of said hydrodynamic unit having an annular extending portion which closely fits over said annular peripheral surface of said flywheel, and said extending portion of said housing having integral projections which extend from the inner side of said extending portion of said shell member into said recess means to rigidly secure said flywheel to said shell member so that said flywheel and said shell member cooperate to form a housing for said hydrodynamic unit.

* * * * *